Feb. 11, 1941.   M. P. BLOMBERG   2,231,150
BRAKE RIGGING
Filed Oct. 6, 1939   2 Sheets-Sheet 1

Inventor
Martin P. Blomberg
By Blackmore, Spencer & Flint
Attorneys

Feb. 11, 1941. M. P. BLOMBERG 2,231,150
BRAKE RIGGING
Filed Oct. 6, 1939 2 Sheets-Sheet 2
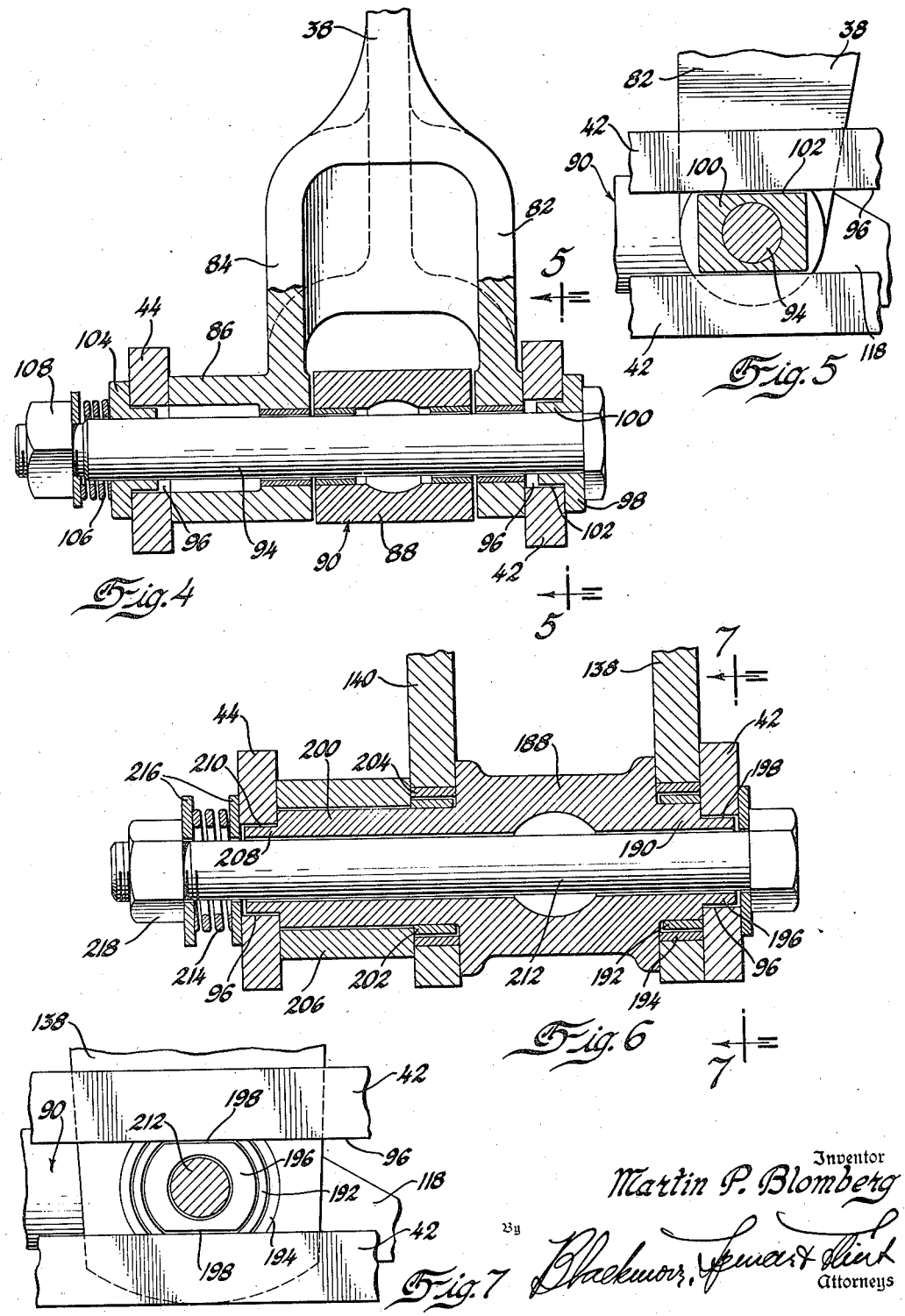
Inventor
Martin P. Blomberg
By Blackmore, Stewart & Flint
Attorneys Patented Feb. 11, 1941

2,231,150

UNITED STATES PATENT OFFICE 2,231,150

BRAKE RIGGING

Martin P. Blomberg, Hinsdale, Ill., assignor to General Motors Corporation, Detroit, Mich., a corporation of Delaware Application October 6, 1939, Serial No. 298,197

5 Claims. (Cl. 188—197)

This invention relates to brake rigging for railway vehicles, and has to do particularly with the construction of the slack adjuster portion of such rigging and the manner of connecting the slack adjuster to the brake levers and tension rods.

An object of the invention is to provide a brake rigging wherein the slack adjuster part of the structure is so devised that all of the working parts thereof are completely housed to protect them from dirt and water and to prevent the escape of lubricant supplied to them for the purpose of reducing friction and preventing corrosion. This of course greatly increases the life of the slack adjuster and makes it easy to adjust under all conditions of operation.

Another object is to improve the connection between the slack adjuster and the brake lever and tension rods it is associated with. In the usual construction, the slack adjuster is connected to these parts by a bolt which passes through all of them, the bolt transmitting the brake applying load from each of these parts to the others and thereby being placed in shear between them. Since these loads are quite heavy and since in the ordinary construction no satisfactory provision for keeping the bolt lubricated is made, the bolts wear sufficiently so that they sometimes break, and when this occurs, the slack adjuster or the tension rods or both may drop down onto the roadbed, and the result of course is that the brake rigging and sometimes other parts of the truck are badly damaged. In my improved form of connection between these parts, I eliminate the possibility of this occurring by constructing a part of the slack adjuster so that it takes all of the load and shearing stresses between it and the brake lever and tension rods, the bolt serving merely to hold the parts in properly assembled relation, and therefore not being placed in shearing relation and not being subjected to any of the brake applying loads, with the result that it does not become worn and therefore cannot become broken during normal usage. The portion of the slack adjuster which transmits the brake applying loads from one part to the other may be made much larger in size and therefore stronger than the bolt, so that there is no danger of it becoming broken as a result of wear.

The above and other objects will be more readily understood by referring to the specification and accompanying drawings, in which Fig. 1 is a side elevational view of one end of a railway car truck, showing my improved brake rigging associated therewith.

Fig. 4 is a sectional view, taken on the line 4—4 of Fig. 1.

Fig. 5 is a sectional view, taken on the line 5—5 of Fig. 4.

Fig. 6 is a view similar to Fig. 4, but showing a modified form of construction.

Fig. 7 is a sectional view, taken on the line 7—7 of Fig. 6.

Figure 1:
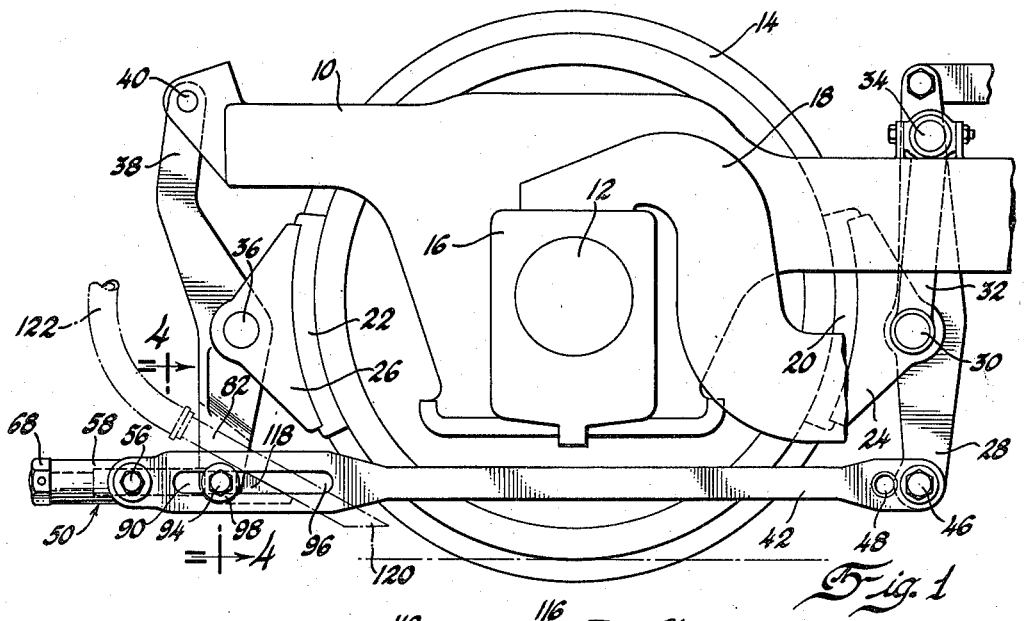

The reference numeral 10 indicates the frame of a railway vehicle truck in which the axle 12 carrying the wheels 14 is journalled in the usual manner in journal boxes 16, and 18 is an equalizer bar, the ends of which rest on top of the journal boxes. The brake rigging shown is of the well-known clasp type, and consists of brake shoes 20 and 22 adapted to be forced against the opposite sides of the wheels, the shoes being carried on brake heads 24 and 26. The brake head 24 is pivotally mounted upon a live truck lever 28 at the point 30, and is supported by a pair of hangers 32 which are pivotally secured to the truck frame at 34, while the brake head 26 is pivotally connected at 36 to a dead truck lever 38 which is pivotally supported from the truck frame at 40. The lower ends of the levers 28 and 38 are connected together by a pair of tension rods 42 and 44 which extend on opposite sides of the wheel, the right hand ends of the tension rods being connected to the bottom of the lever 28 by a bolt 46 which passes through holes formed in the lever and in the tension rods, there being an additional hole 48 formed in each of the rods for a purpose to be described later.

Figure 3:
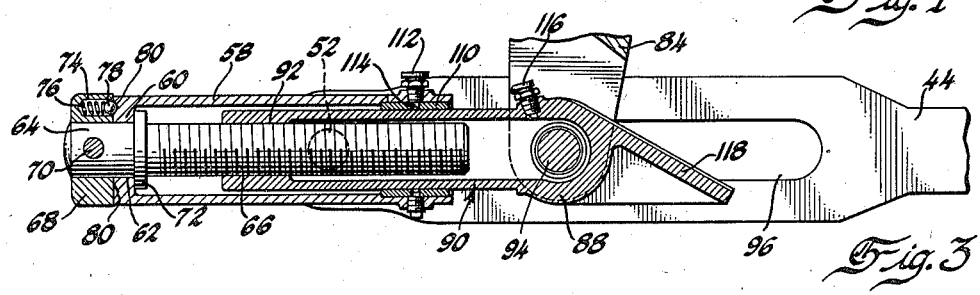
Fig. 3 is a sectional view, taken on the line 3—3 of Fig. 2.
Figure 2:
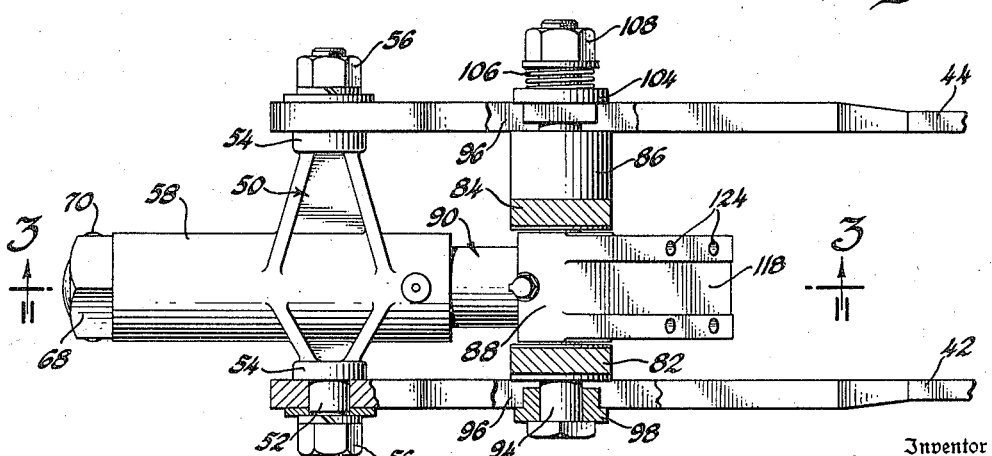
Fig. 2 is a plan view, on a larger scale and with portions broken away, of the left hand end of the brake rigging shown in Fig. 1.

The opposite ends of the tension rods are connected together and held in proper spaced relation to each other by a member 50 having trunnion portions 52 formed on it, which trunnion portions extend through holes provided in the ends of the tension rods, the latter being drawn against shoulders 54 on the member 50 by nuts 56 which are threaded onto the ends of the trunnion portions. Formed on the member 50 is a sleeve portion 58, which as shown in Fig. 3, is open at its right hand end, the opposite end 60 being closed except for a hole 62 formed therethrough. Rotatably supported in this hole is the shank 64 of a screw 66, there being a hexagon shaped head member 68 secured to the shank by a pin 70, this head member being adapted to bear against the end 60 of the sleeve to prevent axial movement of the screw relative to the sleeve in the one direction, while a flange 72 formed on the screw engages the inside surface of the end 60 to prevent axial movement of the screw in the opposite direction. Formed in the head member is an aperture 74 within which is located a compression spring 76 which forces a ball 78 in one of a plurality of detents 80, to hold the screw in adjusted position.

In the form of the invention shown in Figs. 4 and 5, the lower end of the lever 38 is formed in the shape of a yoke having legs 82 and 84 which fit between the tension rods 42 and 44, there being a tubular shaped extension 86 formed on the leg 84 to make the yoke as wide as the space between the tension rods. Located between the legs of the yoke is the end 88 of a slack adjuster nut 90, there being a threaded portion 92 at the opposite end of the nut into which the screw is threaded. The end 88 of the slack adjuster nut is held in place between the legs of the yoke on the lever 38 by a bolt 94 which passes through slots 96 formed in the tension rods, through holes formed in the legs of the yoke and through a hole formed in the end 88 of the slack adjuster nut, there being suitable bushings of anti-friction material provided in these holes at the points where the bolt bears to reduce friction at these points.

Located between the head of the bolt 94 and the tension rod 42 is a washer 98 having a projection 100 which extends into the slot 96 in the rod, the projection having flat sides 102 which are adapted to bear against the edges of the slots for sliding engagement therewith, the width of the projection between the flat sides being slightly less than the width of the slot. A similarly shaped washer 104 fits in sliding engagement in the slot in the tension rod 44, being held in that position by a compression spring 106 located between that washer and a nut 108 threaded onto the end of the bolt 94, the spring serving to keep the parts in tight enough engagement with each other to prevent rattling, while at the same time permitting them to slide relative to each other.

The central portion of the slack adjuster nut is slidably supported in a bushing 110 which is pressed into the open end of the sleeve 58, there being a fitting 112 provided through which lubricant may be supplied to a groove 114 formed in the inner surface of the bushing 110. Another fitting 116 is provided in the end 88 of the slack adjuster nut to admit lubricant to the spaces between the bolt 94 and the bushings through which the bolt passes. Extending inwardly toward the wheel and downwardly at an angle from the end 88 of the slack adjuster nut is a projection 118 upon which is supported a sand pipe 120, to the upper end of which is connected a hose 122 which leads upwardly to the source of supply of the sand, both the pipe 120 and the hose 122 being shown in dotted lines, since they form no part of the present invention. The sand pipe extends through the space between the legs 82 and 84 of the yoke, and may be fastened to the projection 118 by bolts or other fastening means which pass through or are threaded into holes 124 formed in the projection.

The slack adjuster is of course operated by applying a wrench to the head member 68 and rotating the screw 66, which causes the slack adjuster nut 90 to move axially in the sleeve 58. Since the bolt 94 extends through the end 88 of the slack adjuster nut, it is caused to move in the slots 96 in the tension rods, and since the bolt passes through the openings in the legs 82 and 84 on the bottom of the brake lever 38, the latter is also caused to move, thereby changing the position of the brake shoe with respect to the wheel.

When the slack adjuster has been rotated to the point where the bolt 94 is adjacent the right hand end of the slot, as viewed in Fig. 1, the bolt 46 which connects the brake lever 28 to the tension rods is removed from the end holes in the rods, and is replaced in the holes 48, thereby shortening the distance between the brake levers 28 and 38 and moving the brake shoes closer to the wheel, so that the slack adjuster may then be moved in the opposite direction to place the bolt 94 in the end of the slots furthest from the wheel so that the range of adjustment of the slack adjuster may be begun over.

It will be seen that by locating the slack adjuster nut and screw within the sleeve 58, they not only are protected from dirt and water and from being damaged by objects which might come into contact with them if they were not so housed, but also they may be kept properly lubricated, the sleeve serving to retain the lubricant applied through the fitting 112. The space within the end 88 of the slack adjuster nut serves as a reservoir to store lubricant supplied through the fitting 116, from which space the lubricant is fed out to the points where the bolt 94 is journalled in the bushings in the end 88 of the nut and those in the legs 82 and 84. The result is that friction is reduced to a minimum so that the slack adjuster and associated parts work freely at all times, thereby facilitating greatly the adjustment of the brakes, and the life of the structure is increased, due to the protection afforded to the working parts.

In Figs. 6 and 7, I have shown a modification of the structure shown in Figs. 4 and 5. In this construction, while a brake lever similar to the lever 38 and having legs 82 and 84 may be employed, I have shown a lever composed of two bars 138 and 140 which may if desired be connected together in any suitable manner to form a single lever. In this construction, the end 188 of the slack adjuster nut 90, instead of merely extending between the bars 138 and 140, has an annular projection 190 on which is mounted a bushing 192 which is journalled in a bushing 194 pressed into an opening formed in the bar 138. The outer end 196 of the projection extends into the slot 96 in the tension rod 42 and has flatted portions 198 formed on it, the distance between the flatted portions being slightly less than the width of the slot 96 so that the projection may slide freely in the slot. The other side of the end 188 of the slack adjuster nut has a longer annular projection 200 formed on it, which projection extends through a hole in the bar 140, there being a bushing 202 on the projection which bushing bears in a bushing 204 pressed into the hole in the bar 140. A spacer 206 fits over the projection 200 and fills up the space between the tension rod 44, and the bar 140. The end 208 of the projection 200 extends into the slot 96 in the tension rod 44 and has flatted portions 210 formed on it which bear against the edges of the slot for sliding engagement therewith. The whole assembly is held together by bolt 212, which extends through a hole formed through the end 188 of the slack adjuster nut and through the projections 190 and 200, there being a compression spring 214 and washers 216 interposed between the tension rod 44 and a nut 218 threaded onto the end of the bolt 212, the spring serving to keep the parts in firm enough engagement with each other to prevent rattling, yet permitting relative movement between them. The bolt 212 fits loosely enough in the hole in the end 188 of the slack adjuster nut that it may easily be removed or replaced without requiring any hammering on the end of it which might damage it.

The advantage of this construction is that the bolt serves only to keep the other parts of the structure from spreading apart, and does not take any of the brake applying load nor is it placed in shear under any conditions, because since the end 188 of the slack adjuster nut extends all the way across the space between the tension rods, all of the loads and shearing stresses are imposed upon it, and since it is much larger in diameter and therefore stronger than the bolt, it is much less likely to break than the bolt would be. It will be seen that in a construction like that shown in Fig. 4, if for any reason the bolt should become broken, it would be possible for the tension rods or the slack adjuster nut to drop down, and if they did they would strike the roadbed and might cause considerable damage. This is much less likely to happen in the type of construction shown in Fig. 6, since because the bolt receives no wear due to loads or shearing stresses being placed upon it, it is inconceivable that it should become broken during normal usage.

While specific embodiments of the invention have been shown and described, it will be understood that various changes in the details of construction and arrangement of parts may be made without departing from the spirit and scope of the appended claims.

I claim:

1. In a brake rigging, the combination of a pair of tension rods, a member connected to said rods and serving to hold them in spaced relation, a sleeve formed as an integral part of said member, a screw rotatably secured in said sleeve, means associated with said screw adapted to engage said sleeve to hold the screw in adjusted position relative to said sleeve, a brake lever, and a slack adjuster nut member connected to said lever, said nut member being slidably supported within the sleeve and being in threaded engagement with the screw.

2. In a brake rigging, the combination of a pair of tension rods each having a slot formed therein, a slack adjuster nut member located between said rods and having projections extending into said slots for the purpose of slidably supporting the nut member in the slots, the portions of the projections which bear against the edges of the slots being flatted to provide a relatively large bearing area between them and the edges of the slots, and a bolt extending through the projections on the nut member and through the slots for the purpose of holding the parts in assembled relation.

3. In a brake rigging, the combination of a pair of tension rods each having a slot formed therein, a slack adjuster nut member having bearing portions formed thereon, said bearing portions being provided with projections which extend into the slots for the purpose of slidably supporting the nut member in the slots, and a brake lever journalled on said bearing portions.

4. In a brake rigging, the combination of a pair of tension rods each having a slot formed therein, a member located between said rods and connected thereto, said member having a sleeve formed thereon, a screw located within the sleeve and rotatably supported in one end thereof, a bushing secured in the opposite end of the sleeve, a tubular member slidably supported in said bushing, said tubular member having internal threads formed thereon adjacent one end adapted to engage the threads of the screw, projections formed on the opposite end of the tubular member, a brake lever journalled on the projections, said projections extending into and being slidably supported within the slots in the tension rods, and a bolt extending through the projections on the tubular member and through the slots.

5. In a brake rigging, the combination of a pair of tension rods, a member connected to said rods and serving to hold them in spaced relation, a sleeve formed as an integral part of said member, a screw rotatably secured in said sleeve, a flange formed on said screw adapted to engage said sleeve to prevent axial movement of the screw relative to the sleeve in one direction, a member connected to said screw and adapted to engage said sleeve to prevent axial movement of the screw relative to the sleeve in the opposite direction, a spring pressed ball carried by said member adapted to fit into detents formed in the sleeve to hold the screw in adjusted position relative to the sleeve, a brake lever, and a slack adjuster nut member connected to said lever, said nut member being slidably supported within the sleeve and being in threaded engagement with the screw.

MARTIN P. BLOMBERG.